Patented Apr. 14, 1936

2,037,029

UNITED STATES PATENT OFFICE 2,037,029

PROCESS OF PRODUCING A FOOD PRODUCT

John T. Knowles, Chicago, Ill., assignor to Libby, McNeill & Libby, Chicago, Ill., a corporation of Maine No Drawing. Application June 11, 1934, Serial No. 730,068

3 Claims. (Cl. 99—1)

This invention relates to a process for producing a new and improved food product.

This invention relates particularly to a process for preparing vegetables, cereals, and similar foods which are characterized as containing as a natural constituent at least an appreciable quantity of starch.

The process of this invention provides one method of preparing the food product described and claimed in applicant's copending application Serial No. 25,620, filed June 8, 1935.

An object of this invention is to provide a process of producing a food product from food substances which contain in their natural state an appreciable quantity of starch and associated cellulose, the latter of which is present in the form of cell envelopes for the starch and as cellulose bundles and in which the starch granules and the cellulose are reduced to minute particle sizes, with the result that their beneficial dietary functions are increased and improved and their attendant disadvantages which have heretofore been present are eliminated.

A further object of this invention is to provide a process of producing a food product of the above-mentioned character in which the starch containing food cells have been substantially completely separated and disintegrated so that the starch exists in the form of extra-cellular subdivided granules and the cellulose envelopes comprising the starch containing food cells have been broken one from the other and the cellular tissue comprising such cells and other cellulose bundles have been highly disintegrated and subdivided.

A further object of this invention is to provide a process of producing a food product containing starch as an item of its dietary value which is capable of being much more readily and completely digested than has been possible with this type of food prior to the present invention.

A further object of this invention is to provide a process of producing a food product in which the more highly digestible character of the starch is produced by a separation and subdivision of the starch containing food cells so that the starch and other nutrients are extra-cellular and the starch granules are broken. In other words, the starch and other nutrients are substantially completely removed from their cellular envelopes in As an attendant advantage the food product resulting from this invention provides starch as a dietary element which can be substantially completely digested in a very much shorter period of time than has heretofore been possible with the further possibility of being substantially completely digested within the period during which assimilation is possible. This characteristic eliminates the difficulty heretofore encountered of residual starch in the large intestines and the consequent objectionable fermentation which results.

A further advantage flows from the cellulose material which provides bulk and beneficial eliminating properties in the intestinal tract but which, on account of the high degree of subdivision, is non-irritating and is thus free from the common objection of irritation which is frequently unavoidable with cellulose of many vegetable and cereal products in their normal state.

An understanding and appreciation of the products of this invention will be assisted by a brief explanation of the digestive action with respect to foods of the character here referred to. It is known that starch, as such, cannot be assimilated and accordingly its dietary value depends upon an enzyme action which serves to convert the starch into simple sugars. It is also well known that the starch splitting enzymes are secreted in the mouth by the salivary glands and also in the duodenum. In other words, with adults and children having teeth, it is known that the starch-converting action commences with mastication and during a period following when the bolus of food is saturated with saliva and its active enzyme. However, the major starch conversion is effected in the duodenum which progresses to varying degrees of completeness depending upon the form in which the starch is present and the potency of the enzymes in the digestive juices. It is also known, however, that starch as it is contained in many natural foods, such as vegetables and cereals, exists as whole granules and is bound up in cells having strong and resistant walls of cellulose material which renders the starch inaccessible to the converting enzymes. The starch splitting enzymes depend for their action on actual contact with the starch particles.

As a result of this fact digestion of starch as so

An additional advantage flows from the availability of minerals and vitamins which are highly important to all diets and especially diets for infants. In natural foods these minerals and vitamins are held entrapped in the cellulose structure and by the high degree of subdivision of this invention, they are released and rendered more available for immediate assimilation. This enables infants to be supplied with well rounded diets at an early age with the elimination of the major objections which have heretofore existed. Inasmuch as the development of the enzymes of the body is stimulated by consumption of the foods which require their use, the ability to handle these foods may be established at a younger age without danger of suffering those disturbances which heretofore have necessitated withholding such foods until a later age.

It will thus be seen that the product produced is not only a beneficial food substance but that in many cases it has corrective and health-giving properties. It is to be understood that the benefits herein mentioned are also valuable for all human feeding and are thus not restricted to infants.

It should be further understood that the vegetables and cereals treated by this process may be canned foods, that is to say, foods which have been previously cooked and canned in the usual way. With such foods as starting material, the cans may be opened and the contents treated for subdivision and then recanned or dried and packaged for the market.

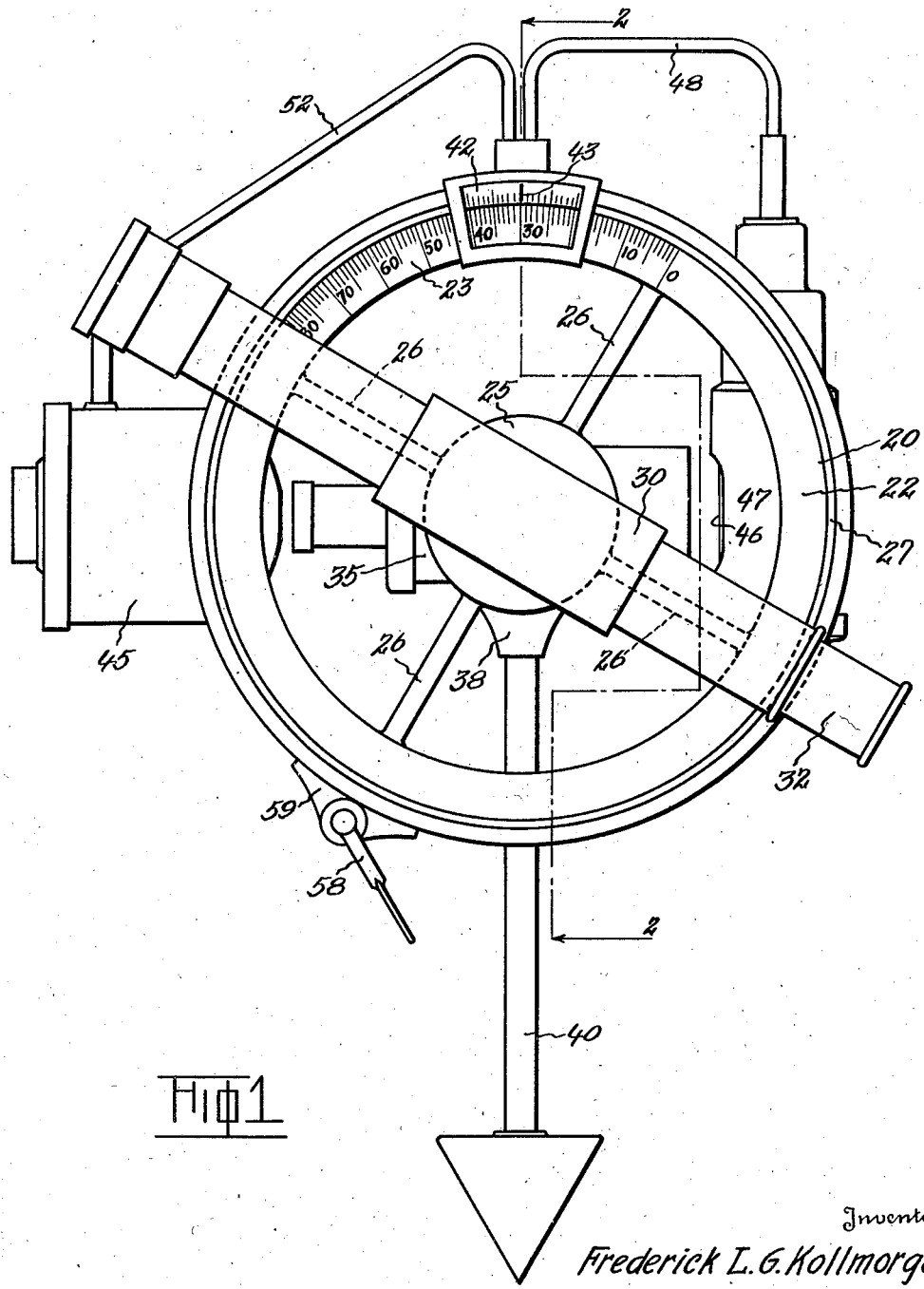

I claim:

1. The herein described process which comprises the steps of cooking a food substance containing natural starch and cellulose to form a softened mass and then subdividing the material of said mass to a degree which separates and disintegrates substantially all of the starch containing food cells, the contained starch granules, and the cellulose, and removes the starch particles of said mass from the wall material of said starch containing food cells, and thus reduces substantially all of said starch to extra-cellular subdivided granules and also reduces substantially all of said cellulose to particle size of substantially the size of the particles of said extra-cellular and subdivided starch.

2. The herein described process which comprises the steps of cooking a food substance containing natural starch and cellulose to form a softened mass, and then subjecting said mass to the action of a disintegrating and subdividing valve at a pressure sufficient to subdivide the material of said mass to a degree which separates and disintegrates substantially all of the starch containing food cells, the contained starch granules, and the cellulose, and removes the starch particles of said mass from the wall material of said starch containing food cells, and thus reduces substantially all of said starch to extra-cellular subdivided granules and also reduces substantially all of said cellulose to particle size of substantially the size of the particles of said extra-cellular and subdivided starch.

3. The herein described process which comprises the steps of cooking a food substance containing natural starch and cellulose to form a softened mass, and then subjecting said mass to the action of a disintegrating and subdividing valve at a pressure of approximately thirty five hundred pounds per square inch so as to subdivide the material of said mass to a degree which separates and disintegrates substantially all of the starch containing food cells, the contained starch granules, and the cellulose, and removes the starch particles of said mass from the wall material of said starch containing food cells, and thus reduces substantially all of said starch to extra-cellular subdivided granules and also reduces substantially all of said cellulose to particle size of substantially the size of the particle of said extra-cellular and subdivided starch.

JOHN T. KNOWLES.